United States Patent
Huo (10) Patent No.: US 12,455,703 B2
(45) Date of Patent: Oct. 28, 2025

(54) MONITORING AND EXPORTING COMMAND EXECUTION TIMES IN A SEMICONDUCTOR DEVICE

(71) Applicant: Micron Technology, Inc., Boise, ID (US)

(72) Inventor: Binbin Huo, Taufkirchen (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/853,809

(22) Filed: Jun. 29, 2022

(65) Prior Publication Data
US 2024/0004582 A1    Jan. 4, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0632* (2013.01); *G06F 3/0652* (2013.01); *G06F 3/0688* (2013.01)

(58) Field of Classification Search
CPC .... G06F 3/0659; G06F 3/0604; G06F 3/0632; G06F 3/0652; G06F 3/0688
See application file for complete search history.

(56) References Cited

U.S. PATENT DOCUMENTS

| | | | |
|---|---|---|---|
| 2019/0079697 A1* | 3/2019 | Suzuki | G06F 3/0659 |
| 2019/0385691 A1* | 12/2019 | Weisickle | G11C 29/36 |
| 2020/0042443 A1* | 2/2020 | Keung | G06F 3/0613 |
| 2020/0192455 A1* | 6/2020 | Kumar | G06F 1/324 |
| 2020/0210104 A1* | 7/2020 | Grosz | G06F 3/0659 |
| 2020/0314480 A1* | 10/2020 | Gupta | H04N 21/43615 |
| 2021/0133175 A1* | 5/2021 | Shabi | G06F 9/30038 |
| 2022/0342559 A1* | 10/2022 | Longo | G06F 3/0635 |

* cited by examiner

*Primary Examiner* — Nanci N Wong
(74) *Attorney, Agent, or Firm* — Greenberg Traurig (57) ABSTRACT

The disclosure relates to improvements in command execution in semiconductor devices. In some aspects, the techniques described herein relate to an apparatus including: a storage array; and a processor configured to: receive a command from a host processor, start to profile the command by initializing a counter at a first time, issue the command to the storage array, receive a response to the command, end profiling of the command at a second time, and update a command timing for a type of the command.

20 Claims, 7 Drawing Sheets

MONITORING AND EXPORTING COMMAND EXECUTION TIMES IN A SEMICONDUCTOR DEVICE

FIELD OF THE TECHNOLOGY

At least some embodiments disclosed herein relate generally to memory devices (e.g., semiconductor memory devices) and, in particular, to improvements in the performance of executing commands in such semiconductor devices.

BACKGROUND

In semiconductor memory devices, the amount of time required to process various instructions may vary over time and may differ from the average time included on datasheets of such semiconductor memory devices. As a result, host processor may not be capable of accurately predicting when an operation performed by an semiconductor memory device may complete and may waste computing resources.

DETAILED DESCRIPTION

In many existing semiconductor devices (e.g., managed NAND Flash devices), a manufacturer manually describes the command execution time of the device in the datasheet of the device. This command execution time is primarily based on the validation and testing of the device in a lab and comprises a fixed number.

However, in the field, command execution times are always not in line with the execution time included in datasheets. This may be due to the internal conditions of the device changing or the lifespan of the semiconductor device. For example, the more a semiconductor device is used, the longer its actual command execution time may be. As another example, a semiconductor device may be performing internal background operations (e.g., garbage collection), and thus the command execution time at that moment may be longer than described in a datasheet.

This variability in command execution times makes it difficult for host-side software to detect or predict each command executing time. Certainly, an average lab-tested command execution time may provide general guidance to a programmer; however, these are fixed values that do not change along with changing internal conditions of a semiconductor device. Thus, in some circumstances, a semiconductor device may require a longer time than the value mentioned in its datasheet.

In current systems, if the host-side software uses a default value set based on the command execution time in the datasheet or device profile, a host-side software timeout event will occur when the host-side software executes a command (e.g., erase, memory array purge/sanitize). Further, for read commands and write commands, current systems utilize a polling-driven completion mode. After the host-side software dispatches a command to the device, the host-side software will poll the command execution status until the command is completed. Alternatively, the host-side software will sleep for a certain time, then wake up and check the status of the device command execution. While sleeping is more efficient than polling (as the host-side processor can perform other tasks), there is no way to determine precisely how long the sleep interval should be, thus resulting in excessive interval lengths or too short of interval lengths.

The example embodiments solve these and other technical problems by exposing an actual command execution time (sometimes referred to as an actual command budget). This actual command execution time may be provided in real-time or near real-time and may be based on the semiconductor device's actual internal conditions at any given moment. In response, a host-side heuristic algorithm can use this actual command execution time to balance its sleeping time for each command. As a result, the example embodiments improve the overall performance of the host-side software. Specifically, the example embodiments improve system-level input/output (I/O) performance, prevent host-side timeouts when the semiconductor device requires a longer time than the value mentioned in the device profile or datasheet and eases semiconductor device production stresses.

In some aspects, the techniques described herein relate to an apparatus including: a storage array; and a processor configured to: receive a command from a host processor, start to profile the command by initializing a counter at a first time, issue the command to the storage array, receive a response to the command, end profiling of the command at a second time, and update a command timing for a type of the command.

In some aspects, the techniques described herein relate to an apparatus, wherein the command includes one of a read command and a write command, or includes other non-data transmission command, such as erase, memory array purge/sanitize.

In some aspects, the techniques described herein relate to an apparatus, wherein initializing a counter includes initializing a register associated with the type of the command.

In some aspects, the techniques described herein relate to an apparatus, wherein initializing a counter includes initializing a portion of a register associated with the type of the command.

In some aspects, the techniques described herein relate to an apparatus, wherein initializing a counter includes initializing a register associated with multiple types of commands.

In some aspects, the techniques described herein relate to an apparatus, wherein updating the command timing includes computing a time difference between the first time and the second time.

In some aspects, the techniques described herein relate to an apparatus, wherein updating the command timing includes computing a number of clock cycles that occur between the first time and the second time.

In some aspects, the techniques described herein relate to a method including: receiving, by a semiconductor device, a command from a host processor; starting, by the semiconductor device, to profile the command by initializing a counter at a first time; issuing, by the semiconductor device, the command to a storage array managed by the semiconductor device; receiving, by the semiconductor device, a response to the command; ending, by the semiconductor device, profiling of the command at a second time; and updating, by the semiconductor device, a command timing for a type of the command.

In some aspects, the techniques described herein relate to a method, wherein the command includes one of a read command and a write command or includes non-data transmission command, such as erase, memory array purge/sanitize.

In some aspects, the techniques described herein relate to a method, wherein initializing a counter includes initializing a register associated with the type of the command.

In some aspects, the techniques described herein relate to a method, wherein initializing a counter includes initializing a portion of a register associated with the type of the command.

In some aspects, the techniques described herein relate to a method, wherein initializing a counter includes initializing a register associated with multiple types of commands.

In some aspects, the techniques described herein relate to a method, wherein updating the command timing includes computing a time difference between the first time and the second time.

In some aspects, the techniques described herein relate to a method, wherein updating the command timing includes computing a number of clock cycles that occur between the first time and the second time.

In some aspects, the techniques described herein relate to a non-transitory computer-readable storage medium for tangibly storing computer program instructions capable of being executed by a computer processor, the computer program instructions defining steps of: receiving, by a semiconductor device, a command from a host processor; starting, by the semiconductor device, to profile the command by initializing a counter at a first time; issuing, by the semiconductor device, the command to a storage array managed by the semiconductor device; receiving, by the semiconductor device, a response to the command; ending, by the semiconductor device, profiling of the command at a second time; and updating, by the semiconductor device, a command timing for a type of the command.

In some aspects, the techniques described herein relate to a non-transitory computer-readable storage medium, wherein initializing a counter includes initializing a register associated with the type of the command.

In some aspects, the techniques described herein relate to a non-transitory computer-readable storage medium, wherein initializing a counter includes initializing a portion of a register associated with the type of the command.

In some aspects, the techniques described herein relate to a non-transitory computer-readable storage medium, wherein initializing a counter includes initializing a register associated with multiple types of commands.

In some aspects, the techniques described herein relate to a non-transitory computer-readable storage medium, wherein updating the command timing includes computing a time difference between the first time and the second time.

In some aspects, the techniques described herein relate to a non-transitory computer-readable storage medium, wherein updating the command timing includes computing a number of clock cycles that occur between the first time and the second time.

Figure 1:
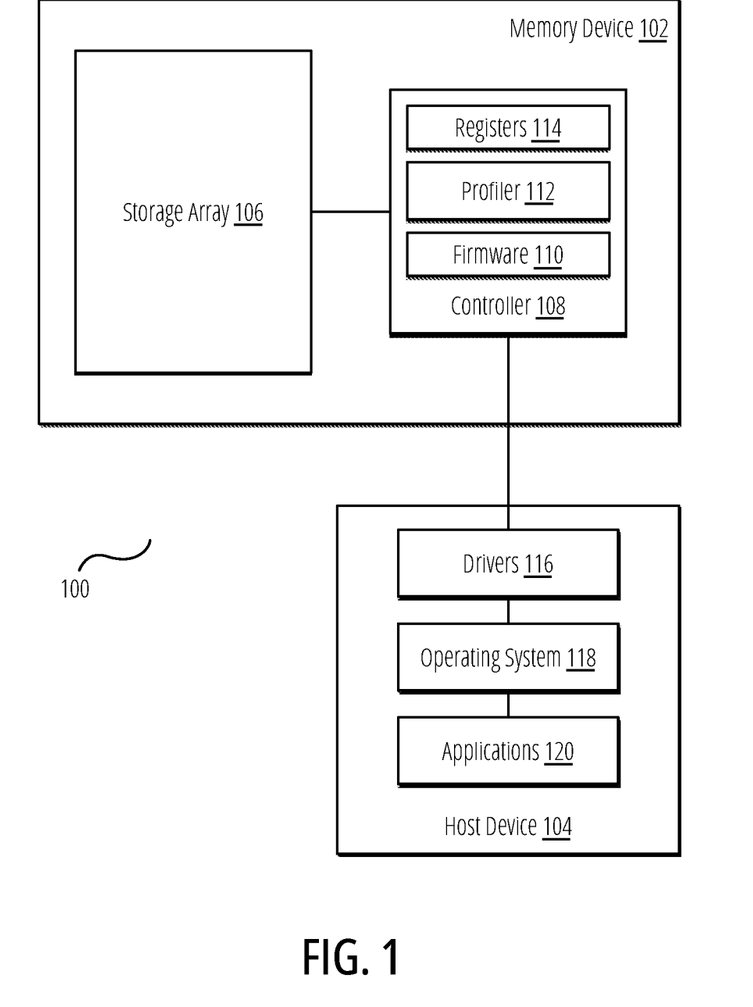
FIG. 1 is a block diagram of a computing system according to some of the example embodiments.

FIG. 1 is a block diagram of a computing system according to some of the example embodiments.

In the illustrated diagram, a computing system 100 includes a memory device 102 communicatively coupled to a host device 104. The memory device 102 can comprise a semiconductor device such as a Flash memory device or similar type of device. In some implementations, the memory device 102 can comprise an embedded multi-media card (eMMC) device. The host device 104 can comprise any type of computing device capable of issuing commands to the memory device 102. For example, the host device 104 may comprise a system-on-a-chip, embedded system, processor, or similar type of computing device.

Memory device 102 includes a storage array 106 for storing data. In some implementations, the storage array 106 can comprise a NAND Flash storage array or other type of non-volatile storage array. In other implementations, the storage array 106 can comprise a volatile storage array such as a dynamic random-access memory (DRAM) array.

Memory device 102 includes a controller 108 that manages the storage array 106. As illustrated, the controller 108 can receive commands from a host device 104 and execute microcode stored in firmware 110 in response. For example, firmware 110 can store microcode routines for handling read commands, write commands, etc. Controller 108 also includes a profiler 112. In some implementations, the profiler 112 can be implemented in microcode stored in firmware 110 and run by controller 108. The profiler 112 is configured to monitor the performance of commands received and executed by controller 108 and update command timings in, for example, one or more registers 114. Details of the operation of the profiler 112 are described more fully in FIG. 2 and are not repeated herein for the sake of clarity.

Figure 3:
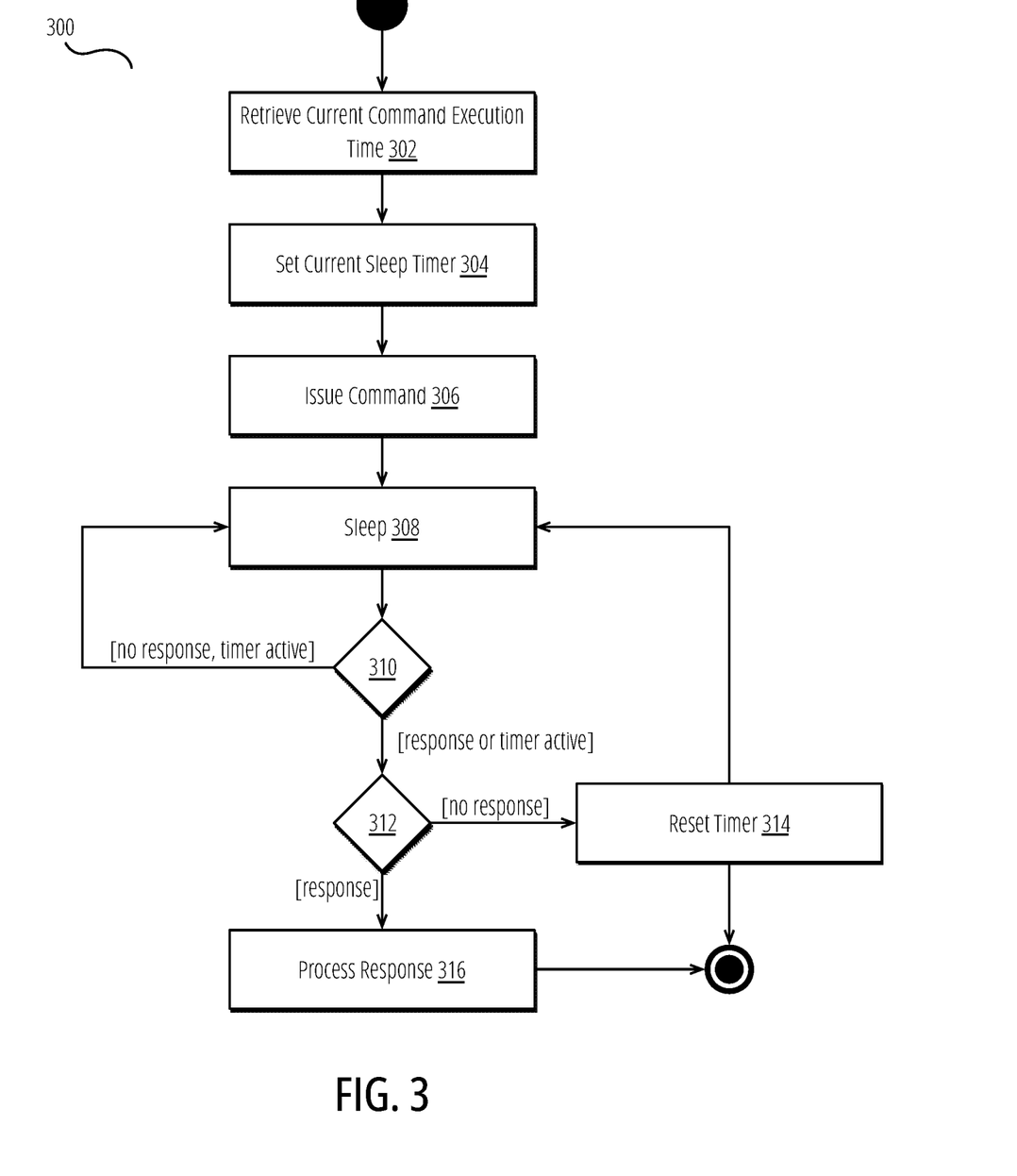
FIG. 3 is a flow diagram illustrating a method for setting a sleep timer based on a dynamic command execution time according to some of the example embodiments.
Figure 4:
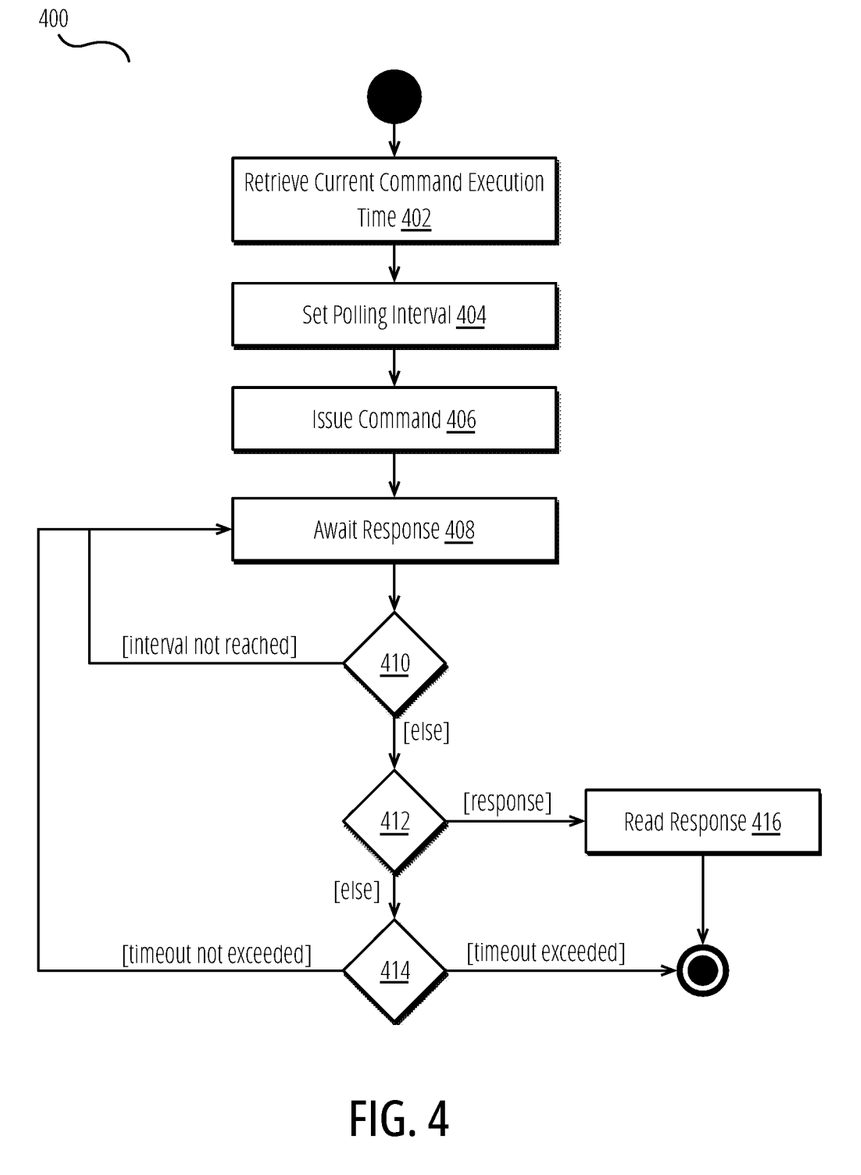
FIG. 4 is a flow diagram illustrating a method for setting a polling interval based on a dynamic command execution time according to some of the example embodiments.
Figure 5:
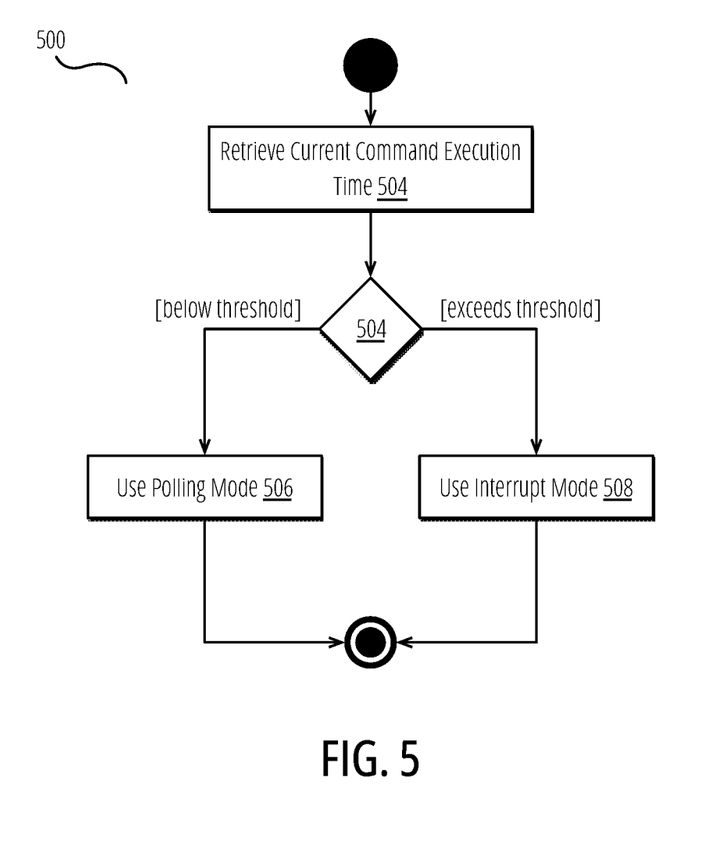
FIG. 5 is a flow diagram illustrating a method for dynamically determining whether to poll or use an interrupt when issuing a command to a semiconductor device according to some of the example embodiments.

As illustrated, a host device 104 includes applications 120, an operating system 118, and drivers 116. Applications 120 may include higher-level code that accesses data stored by the memory device 102 (in, for example, storage array 106). The operating system 118 manages applications applications 120 including the spawning of processes of the applications 120 and lifecycle management of the applications 120. Additionally, the operating system 118 handles filesystem commands issued by the applications 120 such as commands to read and write data to the memory device 102. The host device 104 also includes drivers 116, including a driver for converting filesystem (and other) commands to commands processible by the memory device 102. Ultimately, the drivers 106 issue commands to the memory device 102 for execution. FIGS. 3 through 5 provides operations that can be performed by one or more of applications 120, operating system 118, and drivers 116 and that description is not repeated herein.

Figure 2:
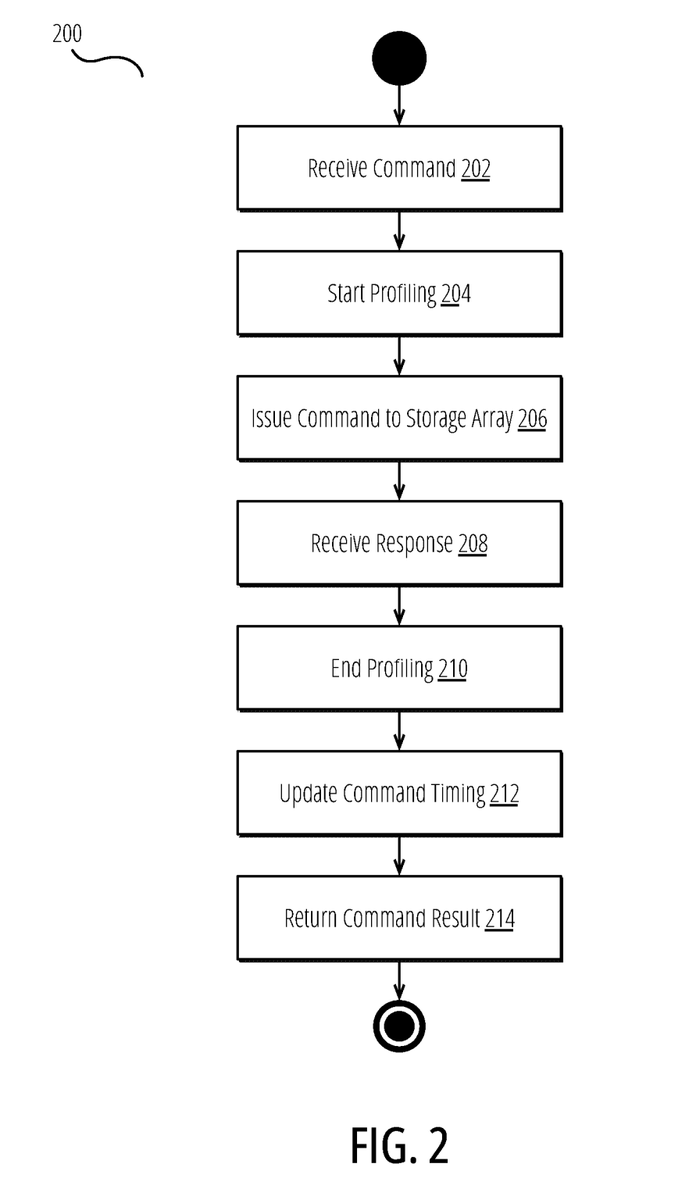
FIG. 2 is a flow diagram illustrating a method for profiling command execution times in a semiconductor device according to some of the example embodiments.

FIG. 2 is a flow diagram illustrating a method for profiling command execution times in a semiconductor device according to some of the example embodiments. Method 200, illustrated in FIG. 2, may be performed by a semiconductor device such as a NAND Flash memory device, eMMC device, etc. Further, method 200 may be executed by the controller of such a semiconductor device.

In step 202, method 200 can include receiving a command from a host.

Method 200 begins by receiving a command from a host over a well-defined channel (e.g., PCIe, SPI, etc.). A device-side interface receives and decodes the command before forwarding the command to a controller (or other processing elements) that can execute some of all of method 200.

The command can include any command executable by a semiconductor device such as a memory device. In one implementation, the command can include any command executable by, for example, an eMMC device. Examples of such commands are those that are described in, for example, eMMC standards promulgated by the Joint Electron Device Engineering Council (JEDEC) or similar standards bodies. The various examples in the disclosure primarily emphasize data read and write commands but apply equally to other commands such as erase, secure erase, secure time, trim, dual data rate commands, etc. Further, references to read commands and write commands apply equally to stream and block variants of such commands.

In step 204, method 200 can include starting to profile the command.

In some implementations, the semiconductor device can maintain a counter. In step 204, the semiconductor device can reset the counter to zero and begin timing the command prior to issuing the command. In some implementations, the timer can be stored in a dedicated register or may be stored in local RAM. In some implementations, the timer can be incremented in regular intervals (e.g., nanoseconds, microseconds, etc.) based on the desired fidelity of the timer and the storage space available for the timer.

In another implementation, the profile can comprise counting the number of clock cycles, and step 204 can include setting the number of cycles elapsed to zero. In this implementation, the semiconductor device can be latched to a clock of the semiconductor device, and the value can be incremented along with the clock of the semiconductor device. In such an implementation, the execution time of the command can be computed by multiplying the number of elapsed clock cycles by a known clock speed.

In step 206, method 200 can include issuing the command to a storage array.

In various implementations, any given command may be associated with lower-level microcode implementing the command. In step 206, method 200 can include executing this lower-level microcode to perform operations associated with the command (e.g., non-data transmission command, data read commands and data write commands). The specific details of how a semiconductor device executes a command using microcode are not limiting and are not described in detail herein. In general, however, the semiconductor device is configured to detect when a microcode routine ends for a given command, and this ending is used to stop the profiling described above.

In step 208, method 200 can include receiving a response to the command.

As discussed, a response generally includes the result of the underlying microcode routine used to handle a command. For a read command, the result may be the data retrieved from the storage array. For a write command, the result may be a status indicator indicating whether the write was successful and (optionally) the data that was written to the storage array. Other commands may return other results; however, each command generally will return a result when the microcode handling the command completes.

In step 210, method 200 can include ending the profiling of the command.

As discussed in step 204, method 200 includes resetting and incrementing a counter. In a first implementation, the counter can be incremented at fixed time intervals (e.g., every nanosecond or microsecond). In a second implementation, the counter can be incremented every clock cycle. In both implementations, after the microcode for a given command completes (i.e., returns a result), method 200 can include stopping the updating of the counter. In the second implementation, step 210 can also include computing a time based on the number of cycles and a clock speed. Thus, in step 210, method 200 ends the profiling of the microcode handling a given command and obtains the amount of time the microcode took to handle the command.

In some implementations, a semiconductor device can execute multiple commands in parallel, either truly in parallel or via a pipelining architecture. In such an implementation, method 200 can be modified to manage multiple in-flight commands. As one example, method 200 can maintain a table of active (i.e., in-flight) commands, return statuses, and counter values. Once a given command completes (as detected in step 210), the corresponding command in the table can be retrieved, and the time of command can be updated according to step 210. Finally, the command that was completed can be removed from the table.

In step 212, method 200 can include updating a command timing.

In some implementations, the semiconductor device includes one or more registers for storing command timings. As used herein, a command timing can include the average amount of time it takes for a command (or commands) to complete.

In a first implementation, the semiconductor device can include dedicated registers for each time of command. For example, a first register can store the average command timing for a sequential read command, a second register can store the average command timing for a block read command, a third register can store the average command timing for a sequential write command, etc. In this implementation, step 212 can include computing a moving average for each new profiled command timing and overwriting the previous average with the new average, thus obtaining a current average timing. In this implementation, in step 212, a type of command is received, which enables the semiconductor to identify the appropriate register and then compute a new average using the register value and the new measured command time.

In a second implementation, the semiconductor device can use a single register to store an average command timing across commands. This implementation is similar to the previous; however, all commands are treated equally, and thus the command timings of disparate types of commands are averaged together to obtain an average command timing across all commands. Such an implementation may be beneficial if the differences between commands are not substantial as it reduces register space.

In a third implementation, a number of registers less than the number of unique commands may be used. In this implementation, portions of registers may be assigned to each command. For example, the first eight bits may be assigned to a sequential read command timing, the next eight bits may be assigned to a block read command timing, etc. In this implementation, updates are performed similarly to that of the first implementation. However, during reading, the host can obtain multiple command timings by reading a single register. Such an implementation reduces the number of registers needed at the expense of granularity.

Although averages are used, other types of calculations can be used. For example, in one implementation, method 200 can select a maximum timing. Thus, instead of computing the average of a previous timing and new timing, method 200 can select the larger of the two and use this as the new command timing. Such a technique stores the "worst case" performance of a command.

While time values (e.g., in nanoseconds) are considered in the foregoing implementations, in some implementations, clock cycles may be stored instead, and the host device may be responsible for computing a time based on a known clock speed. Further, in some implementations, a "drift" from a datasheet value may be stored instead of timing or clock cycle data. In some implementations, a semiconductor device can store in permanent memory one or more lab-tested command timings. In this implementation, the semiconductor device can store an offset (positive or negative, either in time or in clock cycles) from these lab-tested command timings. Such an approach may drastically reduce the storage needed for command timings if the variations from the lab-tested command timings are small (e.g., tens of microseconds, tens of clock cycles, etc.).

In some implementations, the command timings may be normalized before being stored. That is, certain commands (e.g., write or read) vary in execution time based on the amount of data involved in the command. For example, a write of one byte will necessary be shorter than a write of one megabyte. Similarly, reading one byte will be shorter than reading one megabyte. As such, in some implementations, the command timings can be normalized to account for variations in data size. For example, the command timings can be stored in a per-byte manner when appropriate. Thus, the total time recorded in the previous steps can be divided by the total number of bytes involved in the command. Although bytes are used, other units of measurement (e.g., bits, words, etc.) may be used. In this manner, the host processor may be required to compute a total command timing based on a per-unit command timing and the volume of data to access.

In some implementations, method 200 can continuously update command timings. In other implementations, method 200 can periodically "reset" the command timings using a dedicated counter. For example, the first N bits of a register can be used as a counter to count the number of commands used to compute the command timing. When the number of commands used to compute the command timing equals a maximum, the semiconductor device can reset the command timing to the most currently recorded time. For example, after ten block reads, the semiconductor device can reset the command timing of a block read to the eleventh profiled time. Such an approach can ensure more accurate updates to command timings and offset outlier measurements. In another implementation, if the command timings are only stored in registers, the timings will automatically be reset upon a powering off or restarting of the semiconductor device.

In some implementations, command timings takes into account memory array current conditions such as free space ratio, internal dirty ratio, etc, then predicts the time that is needed to complete the next command.

Finally, in some implementations, command timings can be stored in the non-volatile memory of the storage array and transferred to registers during the operation of the semiconductor device.

In step 214, method 200 can include returning a result of the command to a host. As used in step 214, the result refers to the expected result of the command received in step 202. Thus, for example, returning data read from the storage array in response to a read command or returning a status code in response to a write command. The specific type of response returned to the host is not limiting. Indeed, in many implementations, the command/response interface in step 202 and step 214 may be unchanged from a standard protocol (e.g., eMMC) to allow for greater interoperability with host devices. As will be discussed in the next figures, a host device can be modified to utilize the recorded command timings gathered in method 200, but host devices are not required to use such timings, and the use of a standard protocol allows for the optional use of such command timings.

FIG. 3 is a flow diagram illustrating a method for setting a sleep timer based on a dynamic command execution time according to some of the example embodiments. In the various implementations discussed, method 300 can be performed by a host processor or other host-side device communicatively coupled to a semiconductor device that executes method 200.

In step 302, method 300 can include retrieving a current command execution time.

In one implementation, step 302 can include a host processor preparing to execute a command on the semiconductor device (e.g., a read command). In response, the host processor obtains a command timing for the type of command. In one implementation, the host processor can issue a command to the semiconductor device to retrieve this command timing. In this implementation, the command can include the type of command. In response, the semiconductor device can read the corresponding register (or other storage location) and return the command timing.

In another implementation, the semiconductor device can be connected via a protocol that allows for register mapping (e.g., PCIe). In this scenario, the host processor may map one or more registers of the semiconductor device to the memory space of the host device. Thus, step 302 can include reading the mapped registers prior to executing a command.

In yet another implementation, the semiconductor device can be configured to periodically broadcast each of its command timings, and the host device can cache the command timings upon receipt of the broadcast. In this manner, the host processor can locally access command timings prior to executing a command.

In step 304, method 300 can include setting a current sleep timer.

In some implementations, a host device can be configured to sleep for a predefined period after issuing a command to the semiconductor device. During sleep, the host device may not execute any other command. Alternatively, in some implementations, the host device may allow for other commands not relying on the semiconductor device (e.g., not requiring external data). In some implementations, a host device can implement a sleep mode by adjusting, for example, a c-state or p-state of a processor of the host device. In one implementation, the returned command timing can be used directly as the sleep timer value. In other implementations, the host device may calculate the sleep timer based on the command timing. For example, if the command timing value is in clock cycles, the host device can compute the sleep timer by multiplying the clock cycles by the clock speed of the semiconductor device. As another example, if the command timing is an offset from a known value, the host device can read the known value and add or subtract the offset to obtain a sleep timer value.

In step 306, method 300 can include issuing the command. Details of a host processor issuing a command to a semiconductor device are not described in detail herein and any techniques for issuing such commands may be used.

In step 308, method 300 enters a sleep state after issuing the command. As discussed above, the sleep state can be entered by adjusting the c-state or p-state of the processor of the host device. Alternatively, a sleep state can be entered by executing a loop of NOOP operations to keep a processor of the host device busy.

In step 310, method 300 can include determining whether a response was received and whether the sleep timer is active. In general, the host device will await a response from the semiconductor device to the command (e.g., data responsive to a read, status of a write, etc.). If no such response is received, next step 310 includes determining if the sleep timer is active. In some implementations, during step 310, method 300 can decrement the sleep timer (e.g., every nano- or microsecond) and determine if the sleep timer is zero. If the sleep timer is still active and no response has yet been received, method 300 can continue to sleep in step 308. In some implementations, step 310 can include only determining if the sleep timer is active. Thus, method 300 will sleep in step 310 until the sleep timer expires, regardless of the status of a command.

Ultimately, however, a response will be received, or the sleep timer will reach zero. In step 312, method 300 can include determining which result occurred. Specifically, in step 312, method 300 can determine whether a response to the command issued in step 306 was received. In some implementations, a response to the command can be stored in a dedicated area of the host device. As such, in step 312, method 300 can include inspecting this area to determine if a response was received.

If no response was received, method 300 can reset the sleep timer in step 314 and continue waiting for a response. In some implementations, method 300 can re-use the sleep timer value used in step 304. In other implementations, the method 300 can decrease the sleep timer by a fixed amount (on the assumption that the sleep timer used in step 304 was only slightly too short). In other implementations, method 300 can return to step 302 after no response is detected in step 312 to fetch a potentially new sleep timer value from the semiconductor device.

By contrast, if in step 312, method 300 determines that a response was received, method 300 can process the response in step 316. Any mechanism used to process responses from semiconductor devices can be used in step 316, and the specific steps to process a response are not limiting.

As illustrated in FIG. 3, method 300 allows for the dynamic calibration of a sleep timer to use during command execution. In contrast to using a datasheet value, the value of the sleep timer can thus be set on a per-command basis and based on the most recent state of the semiconductor device to reduce the sleep window to more closely match the actual time needed by the semiconductor device to handle a given command.

FIG. 4 is a flow diagram illustrating a method for setting a polling interval based on a dynamic command execution time according to some of the example embodiments. In the various implementations discussed, method 400 can be performed by a host processor or other host-side device communicatively coupled to a semiconductor device that executes method 200.

In step 402, method 400 can include retrieving a current command execution time.

In one implementation, step 402 can include a host processor preparing to execute a command on the semiconductor device (e.g., a read command). In response, the host processor obtains a command timing for the type of command. In one implementation, the host processor can issue a command to the semiconductor device to retrieve this command timing. In this implementation, the command can include the type of command. In response, the semiconductor device can read the corresponding register (or other storage location) and return the command timing. In another implementation, the semiconductor device can be connected via a protocol that allows for register mapping (e.g., PCIe). In this scenario, the host processor may map one or more registers of the semiconductor device to the memory space of the host device. Thus, step 402 can include reading the mapped registers prior to executing a command. In yet another implementation, the semiconductor device can be configured to periodically broadcast each of its command timings, and the host device can cache the command timings upon receipt of the broadcast. In this manner, the host processor can locally access command timings prior to executing a command.

In step 404, method 400 can include setting a polling interval.

In some implementations, a polling interval refers to a time period in which a process will determine if a response was received from a semiconductor device. In contrast to a sleep period, when using a polling interval, the host device will proactively monitor the status of the command and process the response within the polling interval when the response is available. In some systems, a polling operation can be scheduled among other operations, thus allowing the processor to handle other processes while still actively polling the semiconductor device. Thus, unlike a sleep state, the processor is free to continue performing other operations while also polling the semiconductor device.

In some implementations, the polling interval can be set to the command execution timing. In such an implementation, the polling interval operates similar to a sleep timer (discussed in FIG. 3), with the distinction that the processor may perform other operations until the polling interval is reached. In other implementations, the host device may calculate the polling interval based on the command timing. For example, if the command timing value is in clock cycles, the host device can compute the polling interval by multiplying the clock cycles by the clock speed of the semiconductor device. As another example, if the command timing is an offset from a known value, the host device can read the known value and add or subtract the offset to obtain a polling interval. In other implementations, the command timing can be used to compute a smaller polling interval. For example, a percentage of the command timing can be used as the polling interval. As another example, the polling interval can be non-uniform. For example, if the command timing is ten microseconds, the polling timer can be initially nine microseconds and then increased to one microsecond for three intervals to account for plus and minus one microsecond from the command timing.

In step 406, method 400 can include issuing the command. Details of a host processor issuing a command to a semiconductor device are not described in detail herein, and any techniques for issuing such commands may be used.

In step 408, method 400 awaits a response from the semiconductor device. As discussed above, the host device can perform other operations while awaiting a response until the polling interval is reached in step 410.

In step 410, method 400 determines if the polling interval is reached. If not, method 400 continues to await a response in step 408. If, however, the polling interval is reached, method 400 proceeds to step 412.

In step 412, method 400 can include determining if a response to the command is ready, as discussed in FIG. 3. If so, method 400 reads and processes the response in step 416. Any mechanism used to process responses from semiconductor devices can be used in step 416, and the specific steps to process a response are not limiting.

If method 400 determines that no response is detected after the first polling interval, method 400 next determines if a timeout has elapsed in step 414. In some implementations, a fixed timeout may be used to prevent infinite polling. In some implementations, this timeout can be a fixed value. In other implementations, the fixed timeout can comprise a fixed number of polling intervals to execute. If the timeout has not been reached, method 400 returns to step 408 and awaits the next polling interval. Alternatively, if the timeout is exceeded, method 400 can end (and optionally return an error).

FIG. 5 is a flow diagram illustrating a method for dynamically determining whether to poll or use an interrupt when issuing a command to a semiconductor device according to some of the example embodiments. In the various implementations discussed, method 500 can be performed by a host processor or other host-side device communicatively coupled to a semiconductor device that executes method 200.

In step 502, method 500 can include retrieving a current command execution time.

In one implementation, step 502 can include a host processor preparing to execute a command on the semiconductor device (e.g., a read command). In response, the host processor obtains a command timing for the type of command. In one implementation, the host processor can issue a command to the semiconductor device to retrieve this command timing. In this implementation, the command can include the type of command. In response, the semiconductor device can read the corresponding register (or other storage location) and return the command timing. In another implementation, the semiconductor device can be connected via a protocol that allows for register mapping (e.g., PCIe). In this scenario, the host processor may map one or more registers of the semiconductor device to the memory space of the host device. Thus, step 402 can include reading the mapped registers prior to executing a command. In yet another implementation, the semiconductor device can be configured to periodically broadcast each of its command timings, and the host device can cache the command timings upon receipt of the broadcast. In this manner, the host processor can locally access command timings prior to executing a command.

In step 504, method 500 can determine if the command execution time is above or below an interrupt threshold.

In many systems, interrupts are used to respond to responses from external devices such as semiconductor devices. However, with the increase in processing speeds of semiconductor devices, the time penalties incurred by interrupt handling mechanisms often exceed the command execution time. In method 500, a host device may store an estimated interrupt handling cost (in time) to processing responses from the semiconductor device via interrupts. In step 504, method 500 compares the amount of time the semiconductor device will spend handling a given command to the amount of time it will take to handle an interrupt. If the command execution time is shorter than the interrupt handling time, method 500 will proceed to step 506 and use a sleep timer or polling mode as described in FIGS. 3 and 4, respectively. Alternatively, if the interrupt handling time is less than the command execution time, method 500 may proceed to use an interrupt-driven mechanism to handle the response from the semiconductor device in step 508. Specific details on interrupt-driven systems are not described for the sake of clarity, and any existing interrupt handling mechanisms may be used.

As illustrated in method 500, when the command execution time is long and the interrupt handling time is a smaller fraction of the overall processing time, a host device may determine to use interrupts to handle command responses. By contrast, in method 500, when the command execution time is exceedingly short, the time to process the interrupt may dominate the total time to handle a command. In such a scenario, method 500 may opt to use method 300 or method 400 instead of interrupts to reduce the total processing time of a given command.

Figure 6:
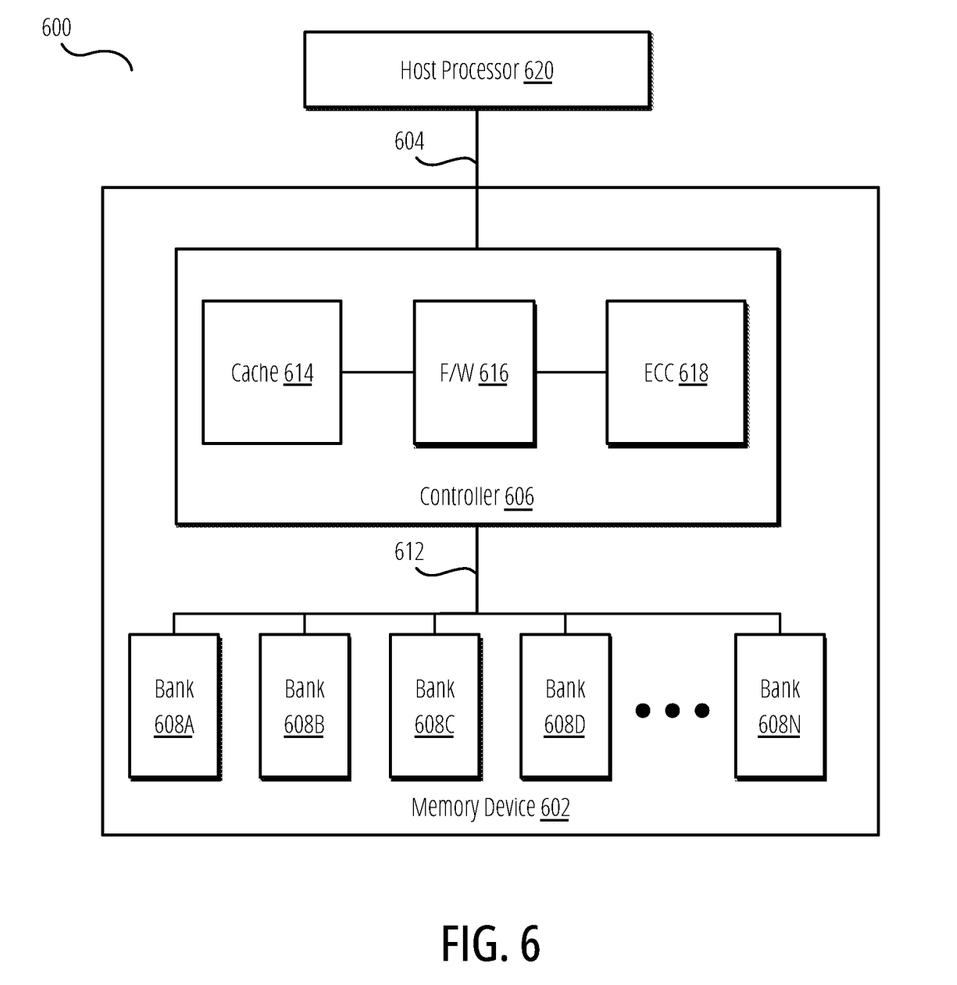
FIG. 6 is a block diagram illustrating a computing system according to some embodiments of the disclosure.

FIG. 6 is a block diagram illustrating a computing system according to some embodiments of the disclosure.

As illustrated in FIG. 6, a computing system 600 includes a host processor 620 communicatively coupled to a memory device 602 via a bus 604. The memory device 602 comprises a controller 606 communicatively coupled to one or more memory banks (e.g., bank 608A, bank 608B, bank 608C, bank 608D, bank 608N, etc.) forming a memory array via an interface 612. As illustrated, the controller 606 includes a local cache 614, firmware 616, and an ECC module 618.

In the illustrated embodiment, host processor 620 can comprise any type of computer processors, such as a central processing unit (CPU), graphics processing unit (GPU), or other types of general-purpose or special-purpose computing devices. The host processor 620 includes one or more output ports that allow for the transmission of address, user, and control data between the host processor 620 and the memory device 602. In the illustrated embodiment, this communication is performed over bus 604. In one embodiment, the bus 604 comprises an input/output (I/O) bus or a similar type of bus.

The memory device 602 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by the controller 606. In some embodiments, the controller 606 comprises a computing device configured to mediate access to and from banks (e.g., bank 608A, bank 608B, bank 608C, bank 608D, bank 608N, etc.). In one embodiment, the controller 606 comprises an ASIC or other circuitry installed on a printed circuit board housing the memory banks (e.g., bank 608A, bank 608B, bank 608C, bank 608D, bank 608N, etc.). In some embodiments, the controller 606 may be physically separate from the memory banks (e.g., bank 608A, bank 608B, bank 608C, bank 608D, bank 608N, etc.). The controller 606 communicates with the memory banks (e.g., bank 608A, bank 608B, bank 608C, bank 608D, bank 608N, etc.) over the interface 612. In some embodiments, this interface 612 comprises a physically wired (e.g., traced) interface. In other embodiments, interface 612 comprises a standard bus for communicating with memory banks (e.g., bank 608A, bank 608B, bank 608C, bank 608D, bank 608N, etc.).

The controller 606 comprises various modules, including local cache 614, firmware 616, and ECC module 618. In one embodiment, the various modules (e.g., local cache 614, firmware 616, and ECC module 618) comprise various physically distinct modules or circuits. In other embodiments, the modules (e.g., local cache 614, firmware 616, and ECC module 618) may completely (or partially) be implemented in software or firmware.

As illustrated, firmware 616 comprises the core of the controller and manages all operations of the controller 606. The firmware 616 may implement some or all of the methods described above. Specifically, firmware 616 may implement the methods described in the foregoing figures.

Figure 7:
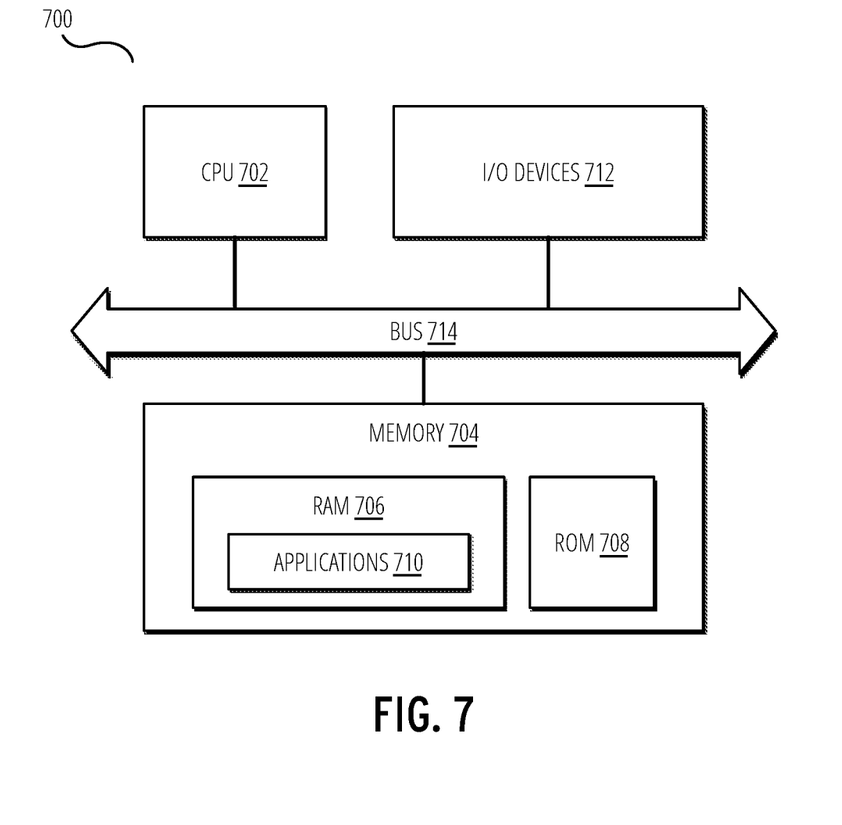
FIG. 7 is a block diagram of a computing device according to some embodiments of the disclosure.

FIG. 7 is a block diagram of a computing device according to some embodiments of the disclosure.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboards, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708, for controlling the low-level operation of the device. The memory can also store an operating system in random-access memory (RAM) for controlling the operation of the device.

Applications 710 may include computer-executable instructions that, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on the context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of order. For example, two blocks shown in succession can, in fact, be executed substantially concurrently, or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and, as such, are not to be limited by the foregoing exemplary embodiments and examples. In other words, functional elements being performed by single or multiple components, in various combinations of hardware and software or firmware, and individual functions, may be distributed among software applications at either the client level or server level, or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions, and interfaces, as well as those variations and modifications that may be made to the hardware, software, or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:
1. A method comprising:
receiving, by a semiconductor device, a command from a host processor;
starting, by the semiconductor device, to profile the command by initializing a counter at a first time;
issuing, by the semiconductor device, the command to a storage array managed by the semiconductor device;
receiving, by the semiconductor device, a response to the command;
ending, by the semiconductor device, profiling of the command at a second time;
normalizing, for each received command, a command timing for a type of the command based on a plurality of first times and second times measured for a plurality of commands of the type of the command, wherein the normalizing accounts for internal conditions of the storage array at the time of command execution; and updating, by the semiconductor device, a command timing for a type of the command based on predicting an execution time of a subsequently received command of the type of the command, wherein the predicting uses the normalized command timing to dynamically adjust for changing internal conditions of the storage array.

2. The method of claim 1, wherein the command comprises one of a read command, a write command, or a non-data transmission command selected from the group consisting of an erase, purge, or sanitize command.

3. The method of claim 1, wherein initializing a counter comprises initializing a register associated with the type of the command.

4. The method of claim 1, wherein initializing a counter comprises initializing a portion of a register associated with the type of the command.

5. The method of claim 1, wherein initializing a counter comprises initializing a register associated with multiple types of commands.

6. The method of claim 1, wherein updating the command timing comprises computing a time difference between the first time and the second time.

7. The method of claim 1, wherein updating the command timing comprises computing a number of clock cycles that occur between the first time and the second time.

8. A non-transitory computer-readable storage medium for tangibly storing computer program instructions capable of being executed by a computer processor, the computer program instructions defining steps of:
receiving, by a semiconductor device, a command from a host processor;
starting, by the semiconductor device, to profile the command by initializing a counter at a first time;
issuing, by the semiconductor device, the command to a storage array managed by the semiconductor device;
receiving, by the semiconductor device, a response to the command;
ending, by the semiconductor device, profiling of the command at a second time;
normalizing, for each received command, a command timing for a type of the command based on a plurality of first times and second times measured for a plurality of commands of the type of the command, wherein the normalizing accounts for internal conditions of the storage array at the time of command execution; and
updating, by the semiconductor device, a command timing for a type of the command based on predicting an execution time of a subsequently received command of the type of the command, wherein the predicting uses the normalized command timing to dynamically adjust for changing internal conditions of the storage array.

9. The non-transitory computer-readable storage medium of claim 8, wherein initializing a counter comprises initializing a register associated with the type of the command.

10. The non-transitory computer-readable storage medium of claim 8, wherein initializing a counter comprises initializing a portion of a register associated with the type of the command.

11. The non-transitory computer-readable storage medium of claim 8, wherein initializing a counter comprises initializing a register associated with multiple types of commands.

12. The non-transitory computer-readable storage medium of claim 8, wherein updating the command timing comprises computing a time difference between the first time and the second time.

13. The non-transitory computer-readable storage medium of claim 8, wherein updating the command timing comprises computing a number of clock cycles that occur between the first time and the second time.

14. An apparatus comprising:
a storage array; and
a processor configured to:
receive a command from a host processor,
start to profile the command by initializing a counter at a first time,
issue the command to the storage array,
receive a response to the command,
end profiling of the command at a second time,
normalizing, for each received command, a command timing for a type of the command based on a plurality of first times and second times measured for a plurality of commands of the type of the command, wherein the normalizing accounts for internal conditions of the storage array at the time of command execution, and
update a command timing for a type of the command based on predicting an execution time of a subsequently received command of the type of the command, wherein the predicting uses the normalized command timing to dynamically adjust for changing internal conditions of the storage array.

15. The apparatus of claim 14, wherein the command comprises one of a read command, a write command, or a non-data transmission command selected from the group consisting of an erase, purge, or sanitize command.

16. The apparatus of claim 14, wherein initializing a counter comprises initializing a register associated with the type of the command.

17. The apparatus of claim 14, wherein initializing a counter comprises initializing a portion of a register associated with the type of the command.

18. The apparatus of claim 14, wherein initializing a counter comprises initializing a register associated with multiple types of commands.

19. The apparatus of claim 14, wherein updating the command timing comprises computing a time difference between the first time and the second time.

20. The apparatus of claim 14, wherein updating the command timing comprises computing a number of clock cycles that occur between the first time and the second time.

* * * * *